(12) United States Patent
Auger et al.

(10) Patent No.: US 8,991,764 B2
(45) Date of Patent: Mar. 31, 2015

(54) LANDING DEVICE FOR A SPACE PROBE, AND LANDING METHOD FOR A PROBE PROVIDED WITH SUCH A DEVICE

(75) Inventors: Valery Auger, Arsac (FR); Christophe Balemboy, Merignac (FR); Robert Andre Laine, Saint Xaudre (FR); Marie-Claire Perkinson, Bedfordshire (GB)

(73) Assignee: Astrium SAS, Paris (FR)

( * ) Notice: Subject to any disclaimer, the term of this patent is extended or adjusted under 35 U.S.C. 154(b) by 0 days.

(21) Appl. No.: 13/257,267

(22) PCT Filed: Mar. 5, 2010

(86) PCT No.: PCT/EP2010/052841
§ 371 (c)(1),
(2), (4) Date: Dec. 21, 2011

(87) PCT Pub. No.: WO2010/105925
PCT Pub. Date: Sep. 23, 2010

(65) Prior Publication Data
US 2012/0080562 A1    Apr. 5, 2012

(30) Foreign Application Priority Data

Mar. 17, 2009   (FR) ...................................... 09 51679

(51) Int. Cl.
| | |
|---|---|
| B64G 1/00 | (2006.01) |
| B64G 1/62 | (2006.01) |
| B64G 1/16 | (2006.01) |
| B64G 1/58 | (2006.01) |
| B64G 1/10 | (2006.01) |

(52) U.S. Cl.
CPC .. *B64G 1/62* (2013.01); *B64G 1/16* (2013.01); *B64G 1/58* (2013.01); *B64G 2001/1064* (2013.01); *B64G 2001/1071* (2013.01)
USPC ................... 244/158.4; 244/158.9; 244/173.1

(58) Field of Classification Search
USPC ................. 244/2, 158.1, 158.4, 158.9, 173.1, 244/173.3, 137.4; 180/22, 23, 24
See application file for complete search history.

(56) References Cited

U.S. PATENT DOCUMENTS

| | | | | | |
|---|---|---|---|---|---|
| 3,164,222 | A | * | 1/1965 | Conrad | 188/381 |
| 3,175,789 | A | * | 3/1965 | Blumrich | 244/100 R |
| 3,270,908 | A | * | 9/1966 | Faget et al. | 220/668 |
| 3,286,629 | A | * | 11/1966 | Laue | 244/159.4 |
| 3,301,511 | A | * | 1/1967 | Webb | 244/138 R |
| 3,387,805 | A | * | 6/1968 | Barnett et al. | 244/138 R |
| 3,558,080 | A | * | 1/1971 | Kretz | 244/17.11 |
| 4,471,926 | A | * | 9/1984 | Steel, III | 244/171.1 |
| 4,854,526 | A | * | 8/1989 | Rochefort | 244/158.1 |
| 5,568,901 | A | * | 10/1996 | Stiennon | 244/63 |

(Continued)

OTHER PUBLICATIONS

Phoenix Landing: Mission to the Martian polar North,Dwayne Brown Et al., May 2008, NASA, p. 22, 23.*

(Continued)

*Primary Examiner* — Tien Dinh
*Assistant Examiner* — Assres H Woldemaryam
(74) *Attorney, Agent, or Firm* — Perman & Green, LLP (57) ABSTRACT

A space probe including a descent module with a mobile exploration vehicle, wherein the descent module is a landing module inside which the mobile exploration vehicle is fastened, the landing module being provided with landing legs which can be deployed under the lower level of the mobile exploration vehicle.

21 Claims, 5 Drawing Sheets

(56) References Cited

U.S. PATENT DOCUMENTS

| | | | | |
|---|---|---|---|---|
| 5,765,784 | A * | 6/1998 | Lapins | 244/173.3 |
| 5,823,476 | A * | 10/1998 | Caplin | 244/158.1 |
| 5,833,175 | A * | 11/1998 | Caplin | 244/158.1 |
| 5,873,549 | A * | 2/1999 | Lane et al. | 244/158.9 |
| 6,227,494 | B1 * | 5/2001 | Turner | 244/172.6 |
| 7,229,048 | B1 * | 6/2007 | August | 244/158.7 |
| 2008/0023587 | A1 * | 1/2008 | Head et al. | 244/158.4 |
| 2009/0206204 | A1 * | 8/2009 | Rosen | 244/158.5 |

OTHER PUBLICATIONS

Robotics for Lunar Surface Exploration (RLSE), Novara M. Et a.l, Mar. 1998, Elsevier Science publishers.*

Design of a Retro Rocket Earth Landing System for the Orion Spacecraft (DRRELSOS), St. Vaughn Joshua Et al. Jan. 2006, IEEE.*
Mars Sample Return Mission (MSRM) 1984 Study Report, J Pieter de Vries et al., NASA, JPL D-1845.*
International Search Report mailing date Apr. 8, 2010.
Muirhead B K: "Mars Pathfinder flight system design and implementation" Aerospace Applications Conference, 1996. Proceedings., 1996 IEEE Aspen, CO, USA Feb. 3-10, 1996, New York, NY, USA,IEEE, US, vol. 2, pp. 159-171, XPOI0159045 ISBN: 978-0-7803-3196-9 A p. 159, col. 1, paragraph 1 pp. 161-162 A p. 166, col. 1, last paragraph-p. 168, col. 1, paragraph 1 figures 1-3,5.
Novara M et al: "Robotics for lunar surface exploration" Robotics and Autonomous Systems, Elsevier Science Publishers, Amsterdam, NL, vol. 23, No. 1-2, Mar. 1, 1998, pp. 53-63, XP004111626 ISSN: 0921-8890 p. 54, col. 1, paragraph 2-p. 58, col. 2, paragraph 1 figures 1-3.

* cited by examiner

LANDING DEVICE FOR A SPACE PROBE, AND LANDING METHOD FOR A PROBE PROVIDED WITH SUCH A DEVICE

CROSS REFERENCE TO RELATED APPLICATIONS

This application is the National Stage of International Application No. PCT/EP2010/052841, international Filing Date, Mar. 5, 2010, which designated the United States of America, and which International Application was published under PCT Article 21(s) as WO publication No. WO 2010/105925 A1 and which claims priority from, and the benefit of, French Application No. 0951679 filed on Mar. 17, 2009.

The aspects of the disclosed embodiments relate to a landing device for a space probe and a landing method for a probe provided with such a device.

BACKGROUND

Several devices and methods are known for the landing of space probes on celestial objects.

In the case of lunar missions, the moon landing of a lunar carrier module of a lunar vehicle is accomplished with retro-rockets, for example, with the lunar module being able to lift off again.

In the case of missions to planets with atmospheres, parachutes are used, for example, to slow down the probes, with the probes being carried by a support module equipped with braking balloons to soften the impact on the ground.

It is found that the set of probes produced up to now comprise a carrier structure and a payload, with the latter, for example, being a travel module of the "rover" type docked in the carrier structure.

The carrier structure is able to absorb the shock of landing and is located below the payload after landing.

If the payload is a module that can move such as a travel module, this load has to descend from the carrier structure after landing to become operational.

An unloading system, ramps, crane, or other type, accordingly has to be provided, with this system increasing the weight of the whole unit.

When the probe lands with the help of balloons or parachutes, the payload has to pass through a zone where there are remainders of the descent system such as linkages or of the deflated fabric, and there is a risk that the wheels of the payload will become entangled in these remainders.

In such a case, inclined sections can be provided to cover the area where the deflated balloons are, for example in particular in the ExoMars project of the ESA.

To mitigate these problems, the probe called the "Mars Scientific Laboratory" of NASA is slated to use a different concept based on a carrier structure that includes a braking parachute device that then releases a transport module that will then perform a quasi-stationary propelled flight above the Martian ground, to lower a Martian module to the ground by means of a crane and a cable.

Such a stationary flight is a complex and costly solution in the matter of propellants, while on the other hand this solution avoids encumbering the module landing site with remainders of the descent system and permits the module to be placed in a well-defined zone.

SUMMARY

The objective of the disclosed embodiments is to produce a landing device for a space module with simplified utilization, and able to bring to the ground a space probe such as a travel module and to facilitate its deployment.

To do this, the disclosed embodiments propose a space probe that includes a descent module carrying a mobile exploration vehicle, for which the descent module is a landing module inside which the mobile exploration vehicle is attached, with the landing module being equipped with landing legs that can be deployed beneath the bottom of the mobile exploration vehicle.

The disclosed embodiments also propose a method for deploying a space probe comprising a descent and landing module that carries a mobile exploration vehicle, for which the mobile exploration vehicle is attached beneath the descent module, with the method including a landing sequence for the probe comprising:

- a braking phase of the descent and landing module conducted by propulsion by means of propulsive gas ejection nozzles,
- a step of deploying landing legs of the descent and landing module,
- a step of landing the descent and landing module provided with the mobile exploration module,
- a step of depositing the mobile exploration module between the legs of the descent and landing module resting on the ground.

BRIEF DESCRIPTION OF THE DRAWINGS

Other characteristics and advantages of the disclosed embodiments will be better understood by reading the following description of a non-limiting example of embodiment of the disclosed embodiments with reference to the drawings, which show.

DETAILED DESCRIPTION

Figure 1:
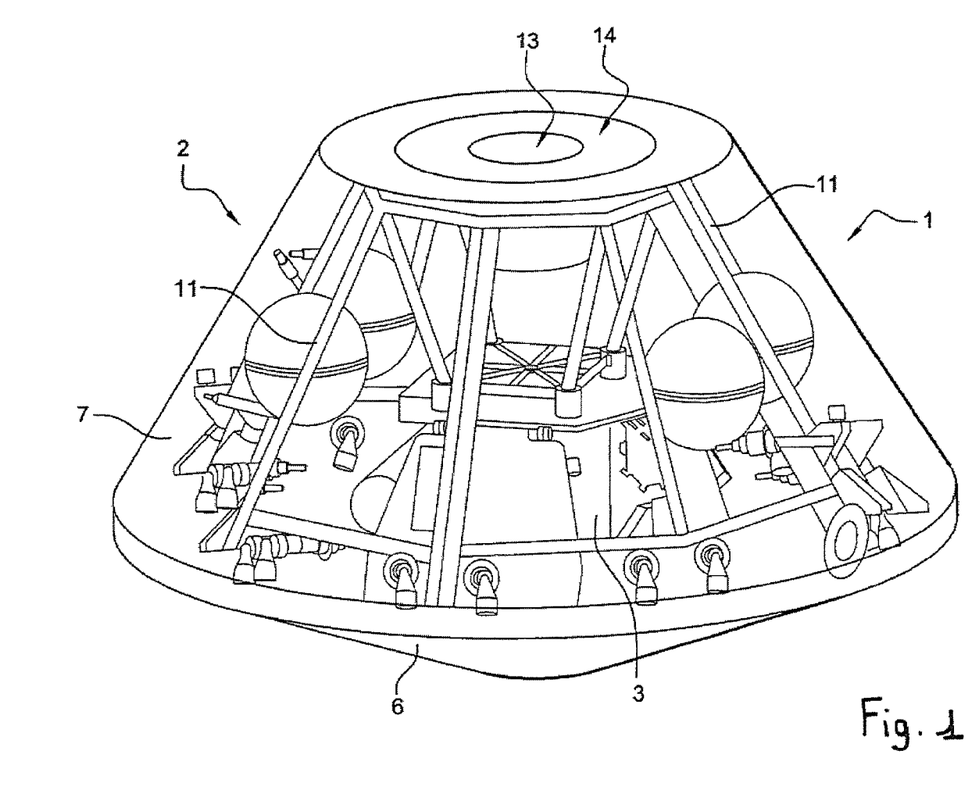
FIG. 1: a perspective view of a probe of the disclosed embodiments equipped with its rear hood shown transparent and its shield.

The space probe 1 of the disclosed embodiments shown complete in FIG. 1 is a probe intended to deposit a planet exploration vehicle and to be applied in particular to a Mars probe.

It includes a descent module 2 carrying a mobile exploration vehicle 3.

The probe shown in FIG. 1 is equipped with a heat shield 6 and a rear hood 7 to protect it during its entry into the atmosphere of a planet.

The rear hood 7 has concentric housings 13 and 14, with the central housing lodging a hypersonic parachute propelled by mortar and the peripheral housing lodging a principal subsonic parachute.

Figure 2:
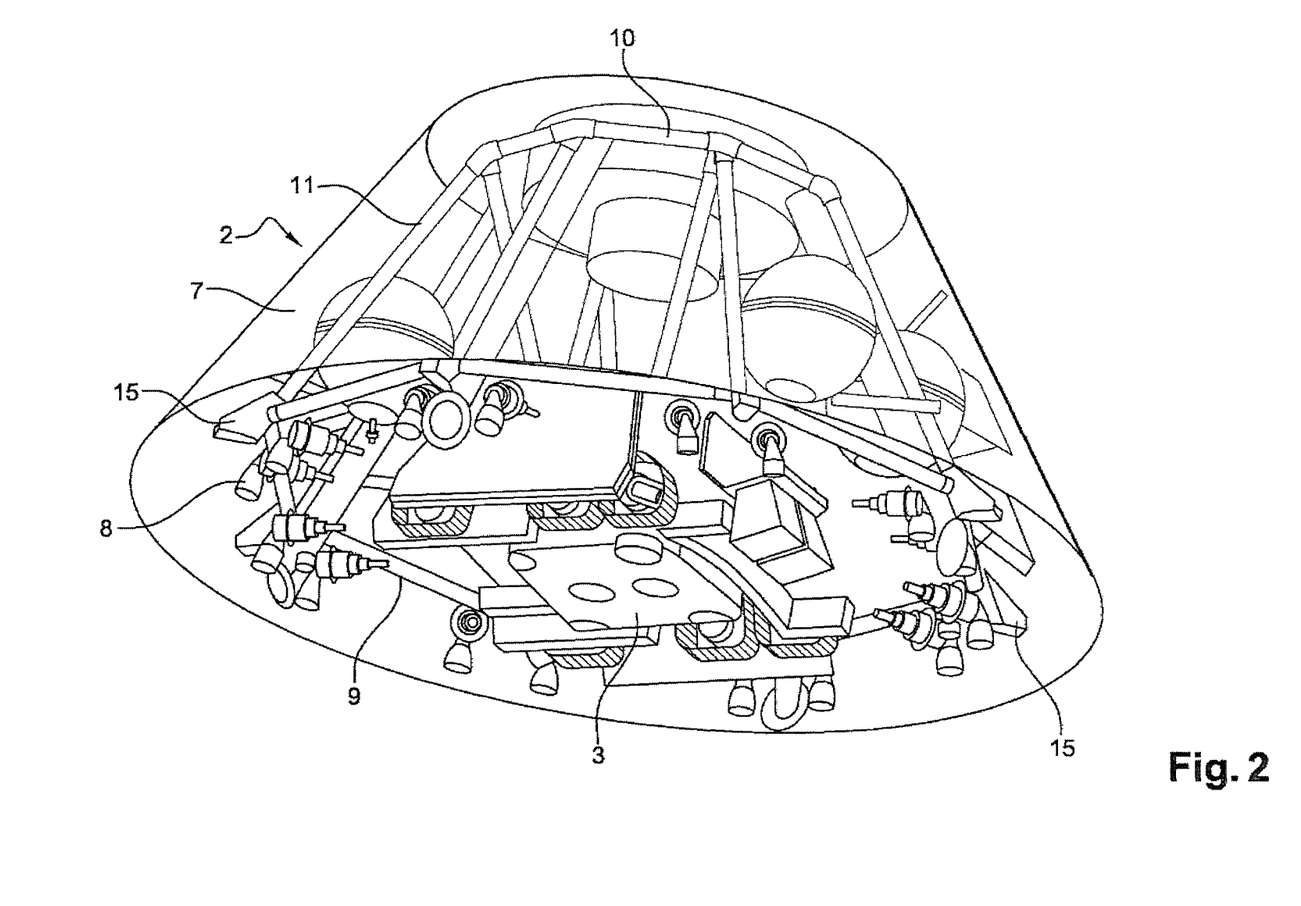
FIG. 2: a perspective view of the probe of FIG. 1 without its shield.

The descent module 2 includes a structure capable of carrying and releasing the lower shield 6, and FIG. 2, showing a section from below the probe with the shield withdrawn, shows fittings 15 that provide for attaching the shield to the lower structure of the descent module.

Figure 3:
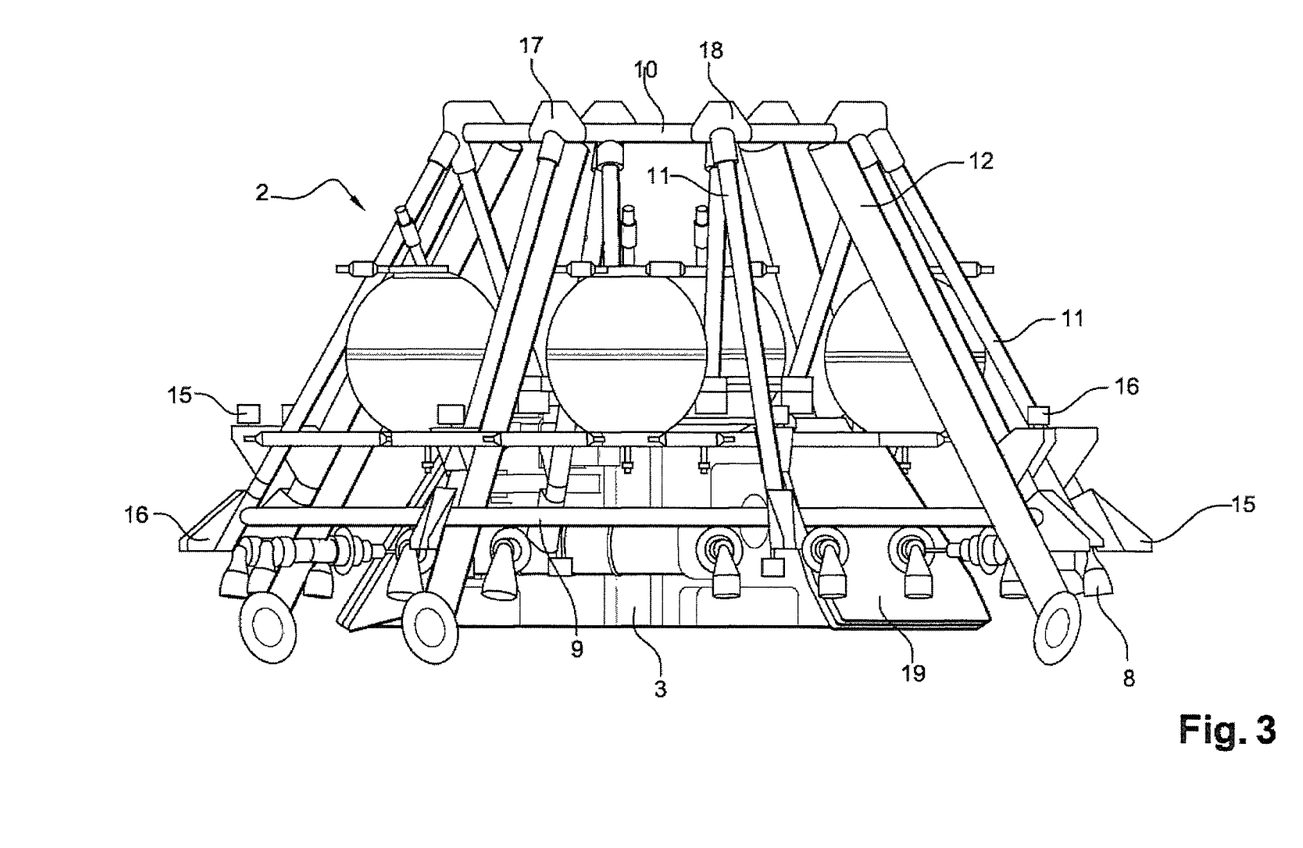
FIG. 3: the probe of FIG. 1 from the side, descent module in piloted flight configuration without its rear hood and without its shield.

Likewise, the descent module includes a structure that can carry the rear hood 7, and FIG. 3 shows lower 16 and upper 17 attachment blocks for fastening the rear hood 7 to the structure of the descent module.

According to the disclosed embodiments, the descent module is a landing module 2 inside which is attached the mobile exploration vehicle, as shown for example in FIGS. 2 and 3.

Figure 6:
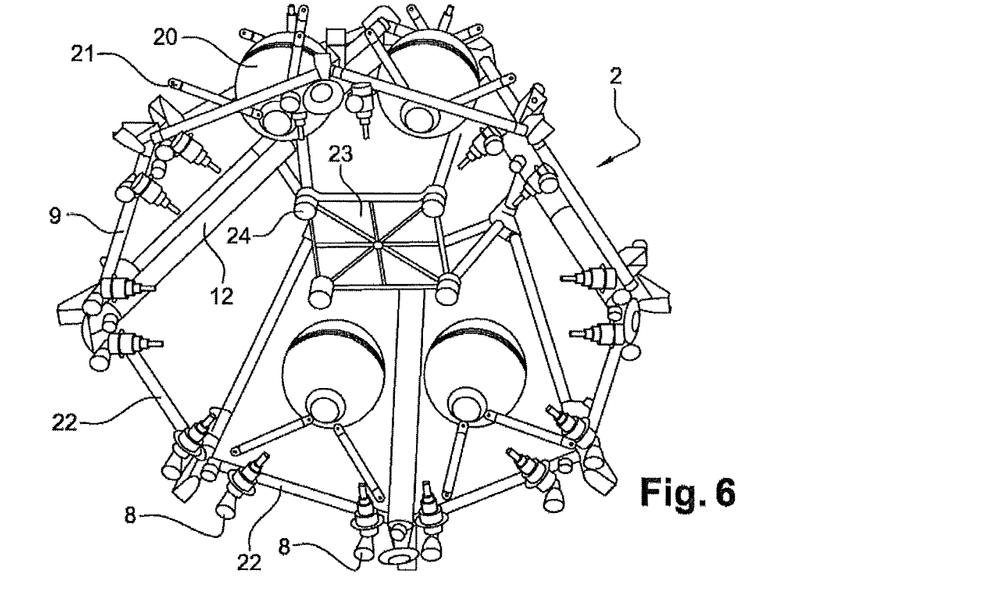
FIG. 6: a perspective view from below of an example of embodiment of the descent and landing module.

More particularly, the mobile exploration vehicle is attached in a lower part of the landing module, for example beneath a platform 23 shown more particularly in FIG. 6, so that the mobile exploration vehicle can be released from the module 2 from beneath the module 2.

Figure 4:
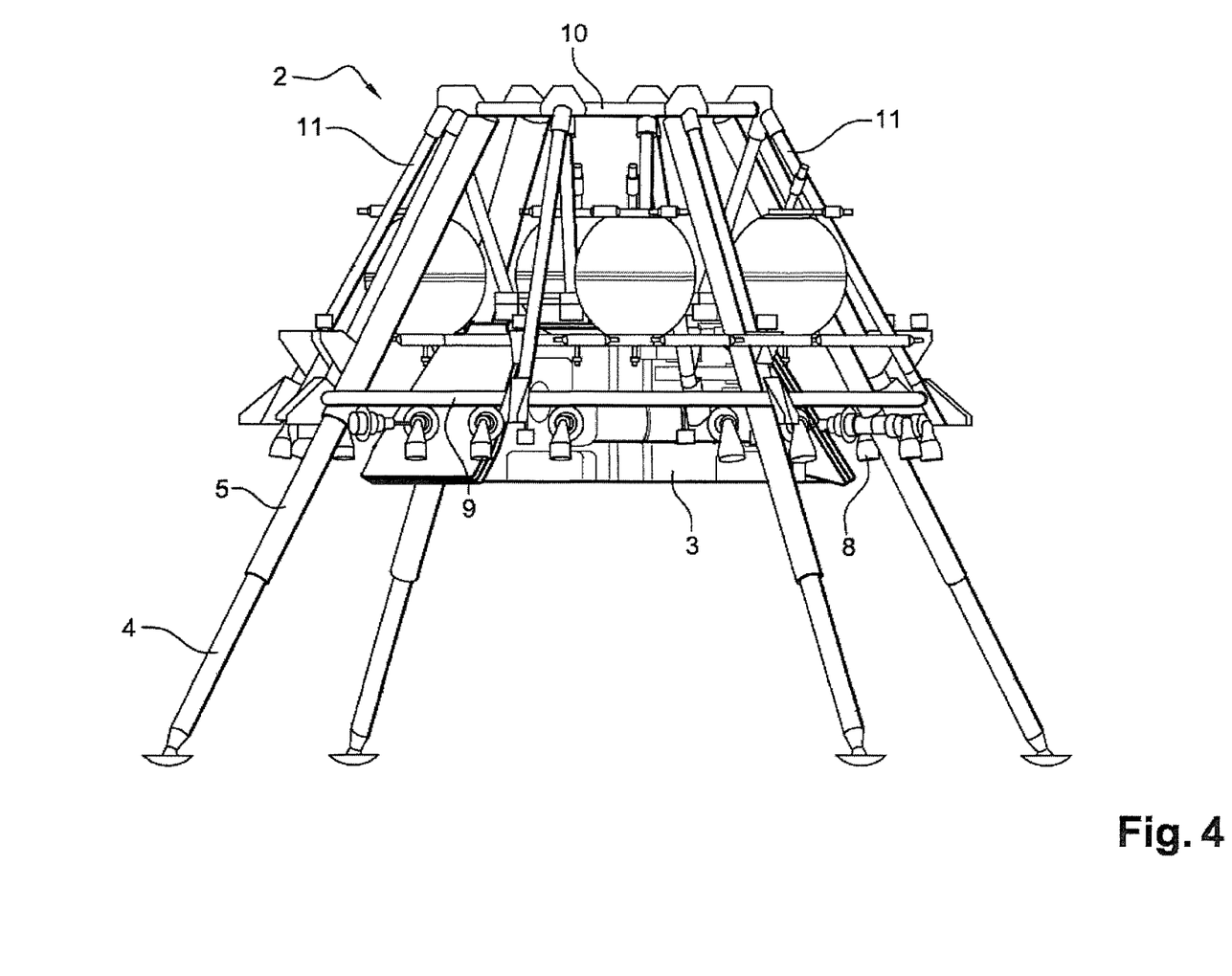
FIG. 4: the probe of FIG. 1, descent module in landing configuration.

The landing module is equipped with landing legs 4, represented in particular in FIG. 4, that can be deployed downward from the lower level of the mobile exploration vehicle 3.

The landing legs are telescoping legs equipped with absorbers 5 that can absorb the shock of landing of the landing module.

According to FIG. 3, the landing legs 4, in a retracted position, are lodged in tubes 12 arranged at the periphery of the landing module 2.

This retracted position of the legs corresponds to the descent and flight configuration of the module.

According to an advantageous embodiment of the disclosed embodiments, the landing module 2 is made in the form of a skeleton surrounding the mobile exploration vehicle.

This skeleton carries the rear hood 7 and contributes to its rigidity, and the hood can thus be made with consideration only of the thermal constraints that it has to resist to protect the landing module and the exploration vehicle.

Figure 5:
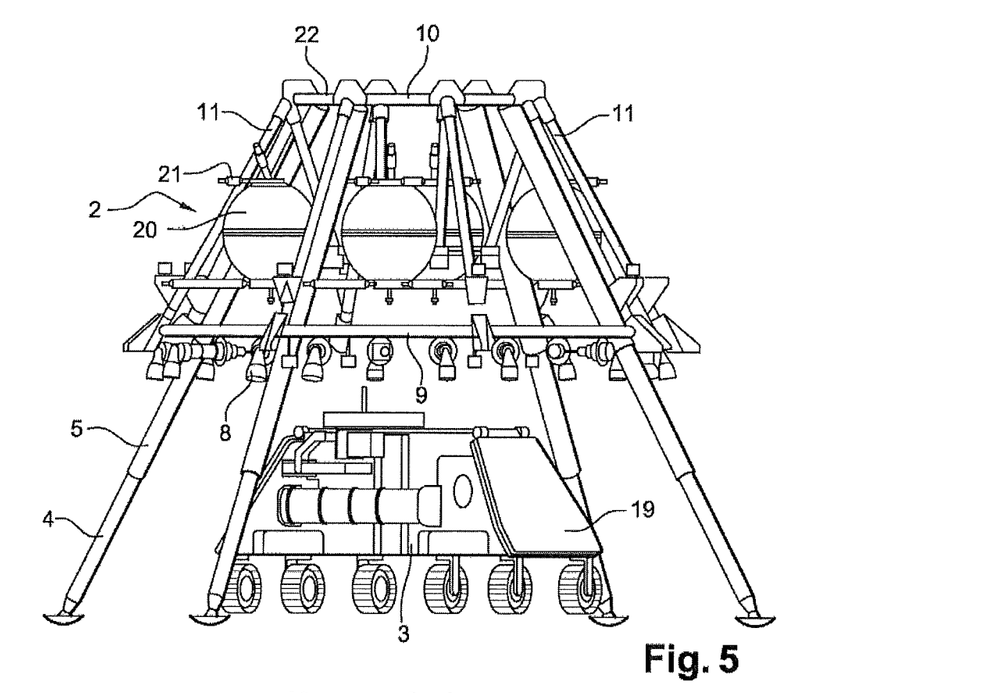
FIG. 5: the probe of FIG. 1 after landing and exploration vehicle placed on the ground.

The landing module as shown particularly in FIG. 5 has an upper framework 10 of generally annular shape with a first diameter, a lower framework 9 of generally annular shape with a second diameter greater than the first diameter, and peripheral uprights 11 linking the upper framework to the lower framework.

The upper 10 and lower 9 frameworks are made with bars 22 joined by T connectors 18 also holding the uprights 11.

This trellis construction forming an external skeleton around the exploration vehicle is light and rigid. Also, with the rear hood and shields jettisoned and once the exploration vehicle has been put in place, this open-design allows solar rays to pass through to the solar panels 19 of the exploration vehicle, which makes it operational and powers its engines so that it can depart from beneath the landing module.

For piloting it in the final descent and landing phase, the landing module has braking nozzles 8.

These nozzles are supplied through a supply circuit from reservoirs 20 fastened to the structure of the module by connecting rods 21 identified in FIG. 5.

In the figures, with the reservoirs not being drawn to scale, the position of the rods is not represented exactly.

According to the example shown, at least some of the braking nozzles are arranged on the periphery of the lower framework 9 of the landing module. According to the example shown, as for example in FIG. 6, the nozzles are distributed and fastened to the bars 22 of the lower framework, with each bar holding two nozzles, and with the nozzles positioned close to the ends of the bars.

As seen above, the descent and landing module of the disclosed embodiments includes landing legs. To reduce the profile of the module in the flight phase, the landing legs 4 are retractable and are lodged in the retracted position in tubes 12 arranged parallel to some of the peripheral uprights 11.

The space probe of the disclosed embodiments permits simple and reliable deployment of an exploration vehicle, and also, by controlling the descent of the landing module, it permits choosing a landing site favorable for the positioning of the exploration vehicle, and finally, it permits limiting the amount of fuel necessary for landing the probe.

The method for deploying the space probe 1 including the descent and landing module 2 carrying a mobile exploration vehicle 3, for which the mobile exploration vehicle is attached beneath the descent module, thus comprises a landing sequence for the probe that includes:
  a braking phase of the descent and landing module conducted by propulsion by means of propulsive gas ejection nozzles 8 during which the module can be piloted to choose a satisfactory landing site, within an altitude of 500 to 1000 meters, with the module then being in the configuration of FIG. 3,
  a step of deploying landing legs 4 of the descent and landing module 2 at the end of the descent and before landing, with the module changing to the configuration of FIG. 4 with the legs deployed,
  a step of landing the descent and landing module provided with the mobile exploration vehicle 3, with the absorbers 5 of the legs taking up the shock of landing,
  a step of depositing the mobile exploration vehicle 3 between the landing legs 4 of the descent and landing module 2 positioned on the ground.

According to the example of FIG. 6, the landing module is fastened beneath a platform 23 of the landing module by means of blocks 24, and for the last step, either the mobile vehicle is simply unhooked from the blocks 24 and falls from the height of the feet 4, or the vehicle is unfastened from the blocks and is slowed in its descent by brake cables.

Before the landing sequence, the method of deployment of the probe comprises a descent sequence that includes:
  an entry phase of the probe into the atmosphere of a planet, with the descent and landing module covered by the rear hood 7 and the shield 6, with the shield serving first as a braking device, and then between entering the atmosphere and down to a velocity of Mach 2, with the probe in the configuration of FIG. 1, with the braking then being accomplished by a hypersonic parachute ejected by a mortar from a housing 13 shown in FIG. 1, down to a velocity below Mach 1,
  at least one slowing phase of the descent and landing module equipped with its rear hood 7 and its shield 6 beneath a principal parachute, with the principal parachute being deployed from a housing 14 after the mortar and the hypersonic parachute have been jettisoned,
  a step of jettisoning the shield 6, with the difference between the ballistic coefficients of the shield 6 and of the probe beneath the principal parachute permitting the shield to distance itself quickly from the probe, with the probe then being in the configuration of FIG. 2.

Once the altitude has reached about 500 to 1000 meters, the method includes a step of jettisoning the rear hood 7 and the principal parachute, with the descent and landing module 2 then changing to flight piloted by means of the nozzles 8 to end its descent and to stop the slowdown as in the configuration of FIG. 3.

At the end of the descent and before landing, the descent module deploys its legs, and finally, once the descent and landing module 2 is placed on the ground, the probe deployment procedure of the disclosed embodiments provides for the mobile exploration vehicle 3 to become disengaged from below the descent and landing module by moving between the landing legs 4 of the descent and landing module.

This motion can be effected after at least partial opening of the solar panels 19 of the vehicle to power the engines of the vehicle.

The probe of the disclosed embodiments is optimized in weight by the sizes of the elements composing the descent and landing module, the size of the rear hood, and keeping the descent module beneath the principal parachute down to a relatively low altitude, to limit the amount of fuel necessary for the last phase of descent.

The disclosed embodiments are not limited to the example described, but encompasses the variants covered by the claims, and in particular the example shown has four legs, but other configurations such as 5 or 6 legs are feasible.

The invention claimed is:

1. A method of deploying a space probe comprising a descent and landing module said descent and landing module carrying a mobile exploration vehicle, wherein said mobile exploration vehicle is attached beneath said descent module, wherein the landing module has an upper framework of generally annular shape with a first diameter, and a lower framework of generally annular shape with a second diameter greater than the first diameter, and peripheral uprights connecting the upper framework to the lower framework forming a trellis construction forming an external skeleton around the exploration vehicle that allows solar rays to pass through the trellis and to solar panels of the exploration vehicle to make such exploration vehicle operational and to power engines of said exploration vehicle so that such exploration vehicle can depart from beneath the landing module said method having a landing sequence for the probe that comprises:
braking the descent and landing module by propulsion by means of propulsive gas ejection nozzles,
deploying the landing legs of the descent and landing module,
landing the descent and landing module provided with the mobile exploration vehicle,
energizing solar panels of said exploration vehicle through said trellis construction, and
depositing the mobile exploration vehicle between the landing legs of the descent and landing module resting on the ground.

2. The method for deploying a space probe according to claim 1, wherein before the landing sequence said method includes a descent sequence comprising:
entry of the probe into the atmosphere of a planet, with the descent and landing module covered by a rear hood and a shield,
slowing the descent and landing module equipped with its rear hood and its shield beneath a principal parachute,
jettisoning the shield,
jettisoning the rear hood and the principal parachute, and changing to a flight piloted mode by means of nozzles.

3. The method for deploying a space probe according to claim 1, wherein when the descent and landing module is landed on the ground, the mobile exploration vehicle is disengaged from below the descent and landing module by a motion of the exploration vehicle between the landing legs of the descent and landing module.

4. A space probe comprising:
a descent module carrying a mobile exploration vehicle, wherein the descent module is a landing module, and wherein the mobile exploration vehicle is attached in a lower part of the landing module, so that the mobile exploration vehicle is released from the module from beneath the module,
said landing module being equipped with landing legs adapted to be deployed below a lower level of said mobile exploration vehicle,
wherein the landing module includes:
an upper framework of generally annular shape with a first diameter,
a lower framework of generally annular shape with a second diameter greater than the first diameter, and
peripheral uprights connecting the upper framework to the lower framework to form a trellis construction forming an external skeleton around the exploration vehicle that allows solar rays to pass through the trellis to solar panels of the exploration vehicle to make such exploration vehicle operational and to power engines of said exploration vehicle so that such exploration vehicle can depart from beneath the landing module.

5. The space probe according to claim 4, wherein said landing legs are telescoping legs equipped with shock absorbers adapted to absorb the shock of landing of the landing module.

6. The space probe according to claim 4, wherein said landing module has a structure adapted to carry and release a lower shield.

7. The space probe according to claim 4, wherein the landing module has a structure adapted to carry a rear hood.

8. The space probe according to claim 4, wherein said skeleton carries a rear hood.

9. The space probe according to claim 4, wherein the landing module has braking nozzles.

10. The space probe pursuant to claim 9, wherein at least some of said braking nozzles are arranged on the periphery of the lower framework of the landing module.

11. The space probe according to claim 4, wherein the landing legs, in a retracted position, are lodged in tubes arranged at a periphery of the landing module, said tubes being part of the peripheral uprights connecting the upper framework to the lower framework.

12. The space probe according to claim 4, wherein the upper and lower frameworks are made with bars joined by T connectors connected to the peripheral uprights.

13. A Space probe comprising: a descent module carrying a mobile exploration vehicle, wherein said descent module is a landing module and the mobile exploration vehicle is attached to the landing module, said landing module being equipped with landing legs that can be deployed below the lower level of the mobile exploration vehicle, wherein the landing module is of a trellis construction forming a skeleton surrounding the mobile exploration vehicle, and wherein the mobile exploration vehicle is positioned to be deposited between the landing legs of the landing module, wherein the landing module has an upper framework of generally annular shape with a first diameter, and a lower framework of generally annular shape with a second diameter greater than the first diameter, and peripheral uprights connecting the upper framework to the lower framework.

14. The space probe according to claim 13, wherein said landing legs are telescoping legs equipped with shock absorbers adapted to absorb the shock of landing of the landing module.

15. The space probe according to claim 13, wherein said landing module has a structure adapted to carry and release a lower shield.

16. The space probe according to claim 13, wherein the landing module has a structure adapted to carry a rear hood.

17. The space probe according to claim 13 wherein said skeleton carries a rear hood.

18. The space probe according to claim 13, wherein the landing module has braking nozzles.

19. The space probe according to claim 18, wherein at least one of said braking nozzles are arranged on the periphery of a lower framework of the landing module.

20. The space probe according to claim 13, wherein the exploration vehicle is fastened beneath a platform attached to landing module by blocks, wherein the exploration vehicle is unhooked from the blocks and falls from said platform onto the ground, or the exploration vehicle is unfastened from the blocks and is slowed in descent by brake cables.

21. The space probe according to claim 20, wherein said landing legs are lodged in tubes arranged parallel to at least one of said peripheral uprights in a retracted position.

* * * * *